United States Patent [19]

Ponzo

[11] Patent Number: 4,604,823
[45] Date of Patent: Aug. 12, 1986

[54] MINNOW TRAP

[76] Inventor: Charles Ponzo, 37 Abby La., Shirley, N.Y. 11967

[21] Appl. No.: 631,333

[22] Filed: Jul. 16, 1984

[51] Int. Cl.⁴ ............................................. A01K 69/10
[52] U.S. Cl. ..................................................... 43/105
[58] Field of Search ................. 43/105, 102, 100, 103

[56] References Cited

U.S. PATENT DOCUMENTS

| | | | |
|---|---|---|---|
| 1,445,763 | 2/1923 | Gibbs | 43/100 |
| 2,218,843 | 10/1940 | Fuller | 43/105 |
| 2,536,281 | 1/1951 | Hamel | 43/105 |
| 3,678,612 | 7/1972 | Hendrickson | 43/105 |
| 3,795,073 | 3/1974 | Olsen | 43/105 |
| 4,030,232 | 6/1977 | Niva | 43/105 |

Primary Examiner—Gene P. Crosby
Attorney, Agent, or Firm—Michael I. Kroll

[57] ABSTRACT

A minnow trap which is effective, simple and inexpensive to fabricate. The trap consists of four mesh covered panels forming a rectangular parallelepiped shaped mesh covered frame with open ends. A rectangular mesh covered frame with aperture is placed across each of these open ends so that small fish may easily swim in but have great difficult in exiting. Three separate embodiments are provided which allow for different collapsing techniques for easy storage, stacking and transport.

13 Claims, 11 Drawing Figures

U.S. Patent   Aug. 12, 1986   4,604,823
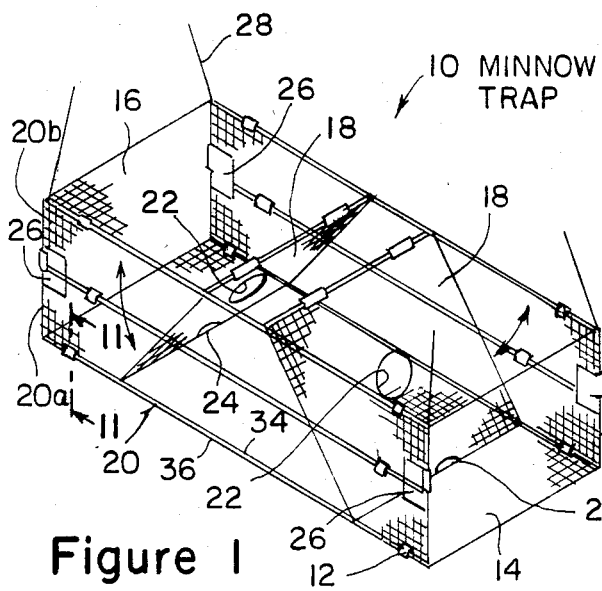
Figure 1
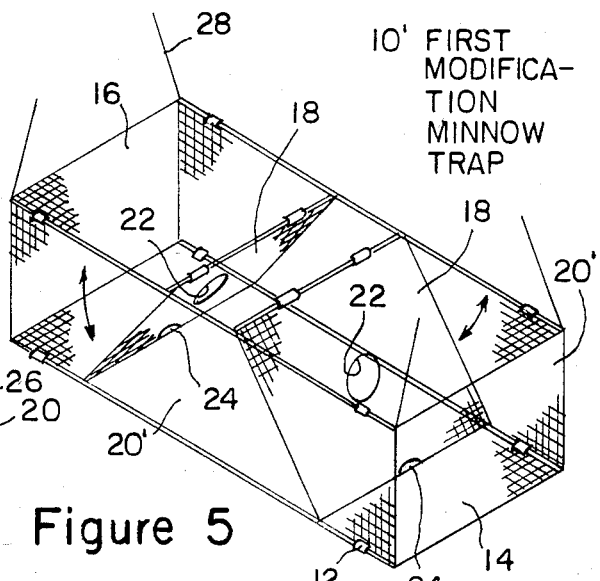
Figure 5
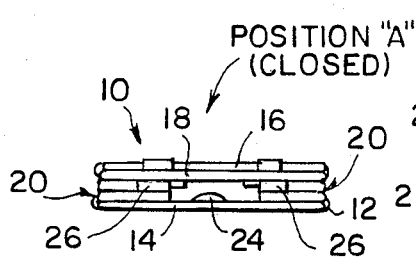
Figure 2
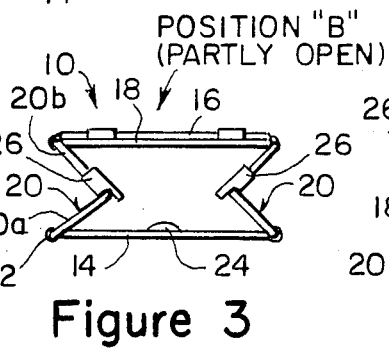
Figure 3
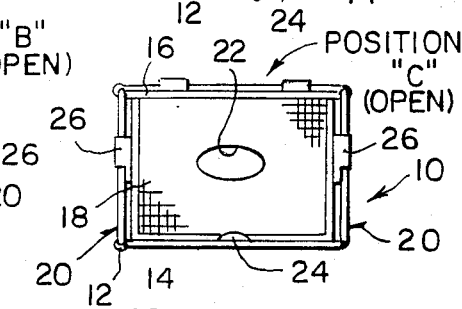
Figure 4
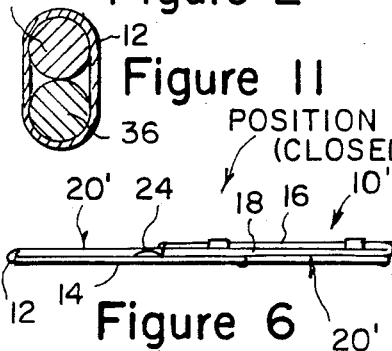
Figure 11 · Figure 6
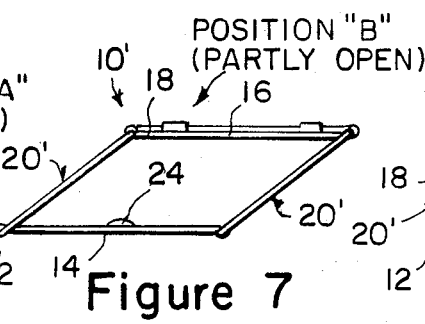
Figure 7
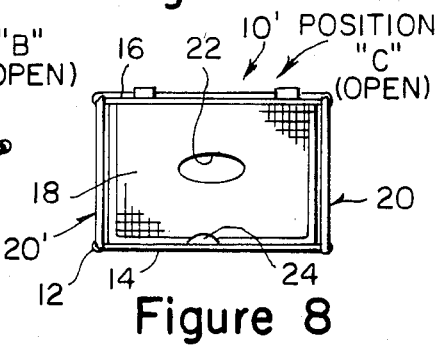
Figure 8
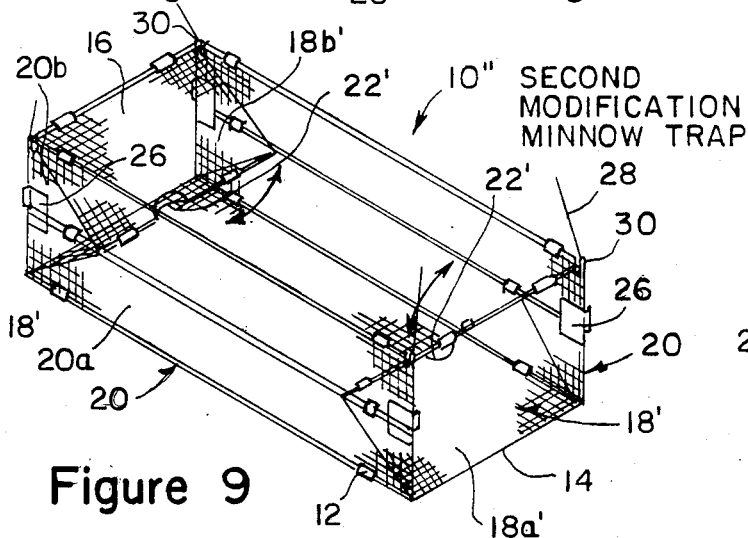
Figure 9
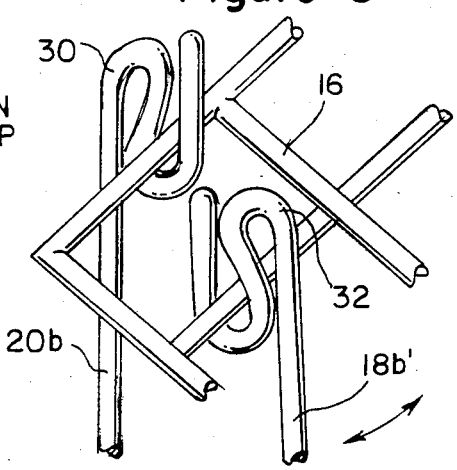
Figure 10

MINNOW TRAP

BACKGROUND OF THE INVENTION

1. Field of the Invention

The present invention relates generally to sporting and fishing equipment and, more specifically, to unattended fish traps for the capture of small fish such as minnows and killies.

2. Description of the Prior Art

At the present state of the art, traps for small fish have a number of shortcomings. They tend to be expensive and difficult to fabricate and, moreover, they consume a great deal of storage and transporting space. A typical fisherman may wish to set a large number of traps and he is frequently limited by the number of traps he can transport and carry to possibly remote fishing spots.

SUMMARY OF THE INVENTION

It is therefore a primary object of the present invention to provide a minnow trap for small fish which is easy to fabricate.

A further object is to provide a minnow trap for small fish which is inexpensive to fabricate.

A yet further object is to provide a minnow trap for small fish which is lightweight.

Another object is to provide a minnow trap for small fish which is easily collapsible for easy storage and transport. The instant invention provides three separate embodiments which provide for alternate techniques for collapsing the minnow trap.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of the invention with folding side members and rigid suspended frame members with apertures.

FIG. 2 is a front plan view of the embodiment of the invention in FIG. 1 shown fully collapsed.

FIG. 3 is a front plan view of the embodiment of the invention in FIG. 1 shown partially open.

FIG. 4 is a front plan view of the embodiment of the invention in FIG. 1 shown fully open.

FIG. 5 is a perspective view of the invention with rigid side members and rigid suspended frame members with apertures.

FIG. 6 is a front plan view of the embodiment of the invention in FIG. 5 shown fully collapsed.

FIG. 7 is a front plan view of the embodiment of the invention in FIG. 5 shown partially open.

FIG. 8 is a front plan view of the embodiment of the invention in FIG. 5 shown fully open.

FIG. 9 is a perspective view of the invention with folding side members, folding suspended frame members with apertures and single loop upper folding hinge.

FIG. 10 is a detail perspective drawing of one of the top hinges on the invention in FIG. 9 utilizing an alternative double loop upper folding hinge.

FIG. 11 is a detailed cross sectional view taken on line 11—11 in FIG. 1.

DETAILED DESCRIPTION OF THE PREFERRED EMBODIMENTS

There are three embodiments of the invention which allow various methods of collapse and storage. The first embodiment 10 is best understood with reference to FIGS. 1, 2, 3 and 4. A rectangular parallelepiped shaped mesh covered frame is formed by rectangular mesh covered members including top panel 16, bottom panel 14 and two split hinged sides 20a and 20b. Once the frame is opened it is prevented from collapsing outwards by one way stops 26. Two rectangular mesh covered frames 18 with apertures 22 are provided so that small fish may easily enter when they detect bait but have great difficulty escaping. Rectangular mesh covered frames 18 are suspended from the top panel sixteen by a number of hinges typified by the detailed hinge drawing of FIG. 11. In FIG. 11 rail 36, part of bottom panel 14, and rail 34, part of side panel 20 are hinged together by a band of material 12 which encircles both rails. Stop clips 24 capture the bottom rails of rectangular mesh covered frames 20 and add strength to the entire structure. Four hoist lines 28 are used to lower the minnow trap 10 into the water and to raise it. FIGS. 2, 3 and 4 show this first embodiment in fully collapsed, partially open and fully opened positions respectively.

The second embodiment 10' is best understood with reference to FIGS. 5, 6, 7 and 8. A rectangular parallelepiped shaped mesh covered frame is formed by rectangular mesh covered members including top panel 16, bottom panel 14 and two side panels 20'. Two rectangular mesh covered frames 18 with apertures 22 are provided so that small fish may easily enter when they detect bait but have great difficulty escaping. Rectangular mesh covered frames 18 are suspended from the top panel sixteen by a number of hinges. Stop clips 24 capture the bottom rails of rectangular mesh covered frames 20 and add strength to the entire structure. Four hoist lines 28 are used to lower the minnow trap 10 into the water and to raise it. FIGS. 6, 7 and 8 show this first embodiment in fully collapsed, partially open and fully opened positions respectively.

The third embodiment 10" is best understood with reference to FIGS. 9 and 10. A rectangular parallelepiped shaped mesh covered frame is formed by rectangular mesh covered members including top panel 16, bottom panel 14 and two split hinged sides 20a and 20b. Once the frame is opened it is prevented from collapsing outwards by one way stops 26. Two split and hinged rectangular mesh covered frames 18a' and 18b' with apertures 22' are provided so that small fish may easily enter when they detect bait but have great difficulty escaping. Rectangular mesh covered frames 18 are hinged at the ends of bottom panel 14. The tops of rectangular mesh covered frames 18b' are temporarily attached by single "S" shaped loops 30 which are curved extensions of side panel frame 20b so that rectangular mesh covered frames 18b' may be snapped in and out of place. Stop clips 24 capture the bottom rails of rectangular mesh covered frames 20 and add strength to the entire structure. Four hoist lines 28 are used to lower the minnow trap 10 into the water and to raise it.

This third embodiment is collapsed by first disengaging rectangular mesh covered frames 18b' from "S" shaped loops 30; lying rectangular mesh covered frames 18a' and 18b' down flat and collapsing side panels 20a and 20b inwards.

In FIG. 10 an alternate form of double "S" loop attachment is illustrated. Top panel 16 is first attached to side panels 20b by "S" loop extensions of 20b labelled 30. Then, the tops of rectangular mesh covered frames 18b' are attached to top panel 16 by "S" loop extensions of 18b' labelled 32. This method allows for partial disassembly of the minnow trap.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A minnow trap, comprising in combination:
   (a) a frame, shaped like a rectangular parallelepiped covered on the top and bottom and two sides with mesh but having open ends whereby small fish may swim into either of said ends but are prevented from exiting said top or said bottom or said sides due to the separation of the strands of said mesh;
   (b) two rectangular frames, covered with mesh wherein each of said rectangular mesh covered frames are suspended from said top to said bottom of said rectangular parallelepiped mesh covered frame slanting toward each other and located at a distance inward from said open ends of said rectangular parallelepiped mesh covered frame to provide a cove for said small fish; further comprising an aperture in the center of each of said rectangular mesh covered frames whereby small fish may enter through either of said apertures but are trapped in the open space between said rectangular mesh covered frames and the interior of said rectangular parallelepiped shaped mesh covered frame; and,
   (c) means for collapsing said minnow trap.

2. A minnow trap, as recited in claim 1, wherein said rectangular parallelepiped shaped frame comprises two equal dimensioned rectangular mesh covered frames which form side walls and two equal dimensioned rectangular mesh covered frames which form bottom and top surfaces of said rectangular parallelepiped shaped mesh covered frame.

3. A minnow trap, as recited in claim 2, wherein said two equal dimensioned rectangular mesh covered frames which form side walls and said two equal dimensioned rectangular mesh covered frames which form bottom and top surfaces of said rectangular parallelepiped shaped mesh covered frame are connected by hinges in at least two positions along the four planes of intersection of said frames.

4. A minnow trap, as recited in claim 3, wherein said hinges comprise an elliptically shaped band of material which encircles adjacent frame members and wherein mesh is removed as necessary in order to permit free hinging of said frame members.

5. A minnow trap, as recited in claim 1, wherein said means for collapsing said minnow trap comprises two equal dimensioned rectangular mesh covered frames which form side walls wherein each of said side walls comprises two separate split frames hinged along intersecting planes such that said side walls fold inwards thereby allowing said bottom and said top surfaces to move together thereby collapsing said rectangular parallelepiped shaped mesh covered frame; and, said two rectangular frames being rigid and suspended by hinges from bars running perpendicularly across said top frame, whereby, when said rectangular parallelepiped shaped mesh covered frame is collapsed, said two rigid rectangular shaped mesh covered frames pivot upwards and do not interfere with the collapsing process.

6. A minnow trap, as recited in claim 5, further comprising one way stops located at the intersection of said split side frames such that said rectangular parallelepiped shaped mesh covered frame can only be collapsed inwards and not outwards.

7. A minnow trap, as recited in claim 5, further comprising two stop clips placed upwards upon said bottom surface of said rectangular parallelepiped shaped mesh covered frame such that when said minnow trap is opened both of said said rigid rectangular mesh covered frames may be secured.

8. A minnow trap, as recited in claim 4, wherein said means for collapsing said minnow trap comprises two equal dimensioned rectangular mesh covered frames which form side walls thereby allowing said bottom and said top surfaces to move parallel to each other thereby collapsing said rectangular parallelepiped shaped mesh covered frame by forming a collapses parallelogram at each end; and said two rectangular frames being rigid and suspended from bars running perpendicularly across said top frame by a hinge, whereby, when said rectangular parallelepiped shaped mesh covered frame is collapsed, said two rigid rectangular shaped mesh covered frames pivot upwards and do not interfere with the collapsing process.

9. A minnow trap, as recited in claim 8, further comprising two stop clips placed upwards upon said bottom surface of said rectangular parallelepiped shaped mesh covered frame such that when said minnow trap is opened both of said said rigid rectangular mesh covered frames may be secured.

10. A minnow trap, as recited in claim 1, wherein said means for collapsing said minnow trap comprises two equal dimensioned rectangular mesh covered frames which form side walls wherein each of said side walls comprises two separate split frames hinged along intersecting planes such that said side walls fold inwards thereby allowing said bottom and said top surfaces to move together thereby collapsing said rectangular parallelepiped shaped mesh covered frame; and, further comprising said two rectangular shaped mesh covered frames wherein each of said rectangular mesh covered frames comprises two separate split frames hinged along intersecting planes wherein the bottom of said split frames is hinged to the bottom member of said rectangular parallelepiped shaped mesh covered frame and the top of each of said two split frames is temporarily attached to the top member of said rectangular parallelepiped shaped mesh covered frame by S shaped loops formed from extensions of said side members of said rectangular parallelepiped shaped mesh covered frame, whereby, when said rectangular parallelepiped shaped mesh covered frame is collapsed, said two split mesh covered frames are snapped out of said S shaped loops; are folded inwards, flatly; and, then, said rectangular parallelepiped shaped mesh covered frame may be collapsed by folding said side walls inwards thereby bringing said top member and said bottom member together.

11. A minnow trap, as recited in claim 10, further comprising one way stops located at the intersection of said split side frames such that said rectangular parallelepiped shaped mesh covered frame can only be collapsed inwards and not outwards.

12. A minnow trap, as recited in claim 10, further comprising two stop clips placed upwards upon said bottom surface of said rectangular parallelepiped shaped mesh covered frame such that when said minnow trap is opened both of said rectangular mesh covered frames may be secured.

13. A minnow trap, as recited in claim 1, further comprising hoist lines tied to each of the four corners of the top member of said rectangular parallelepiped shaped mesh covered frame, whereby said minnow trap may be lowered into the water or raised therefrom.

* * * * *